United States Patent
Mo et al.

(10) Patent No.: US 9,806,517 B2
(45) Date of Patent: Oct. 31, 2017

(54) APPARATUS FOR TRANSMITTING POWER AND CONTROL METHOD THEREOF

(71) Applicant: Kyungshin Co., Ltd., Incheon (KR)

(72) Inventors: Jung Hyuk Mo, Incheon (KR); Geum Bae Jung, Gyeonggi-do (KR)

(73) Assignee: Kyungshin Co., Ltd., Incheon (KR)

( * ) Notice: Subject to any disclaimer, the term of this patent is extended or adjusted under 35 U.S.C. 154(b) by 498 days.

(21) Appl. No.: 14/477,276

(22) Filed: Sep. 4, 2014

(65) Prior Publication Data

US 2015/0372477 A1    Dec. 24, 2015

(30) Foreign Application Priority Data

Jun. 18, 2014 (KR) .......................... 10-2014-0074417

(51) Int. Cl.
*H01H 9/30* (2006.01)
*H02H 7/22* (2006.01)
*B60L 11/18* (2006.01)

(52) U.S. Cl.
CPC .............. *H02H 7/222* (2013.01); *B60L 11/18* (2013.01)

(58) Field of Classification Search
USPC ............................................. 361/13, 2, 3, 7
See application file for complete search history.

(56) References Cited

U.S. PATENT DOCUMENTS

| | | | | |
|---|---|---|---|---|
| 8,063,506 B2* | 11/2011 | Sakata | ................... | H02H 9/001 |
| | | | | 307/10.1 |
| 8,174,801 B2* | 5/2012 | Liu | ........................ | H01H 9/542 |
| | | | | 361/13 |
| 9,423,442 B2* | 8/2016 | Henke | .................... | G01R 31/02 |

(Continued)

FOREIGN PATENT DOCUMENTS

KR    10-2010-0062702    12/2010

*Primary Examiner* — Ronald W Leja
(74) *Attorney, Agent, or Firm* — Cesari and McKenna, LLP

(57) ABSTRACT

Disclosed are an apparatus for transmitting power and a control method thereof. The apparatus includes a first main relay electrically controlling connection between a positive (+) terminal of a high voltage power source and a positive (+) terminal of a high voltage load, a second main relay electrically controlling connection between a negative (−) terminal of the high voltage power source and a negative (−) terminal of the high voltage load, a semiconductor switch connected in parallel to the first main relay, a reverse current preventer interposed between the semiconductor switch and the high voltage power source and preventing reverse current to the high voltage power source, a drive state measurer measuring a drive state of a power relay assembly, and a relay controller supplying or shutting off power to the high voltage load by operating the first and second main relays and the semiconductor switch in response to a relay enable signal from a battery controller and shutting off the power to the high voltage load upon determining that the drive state of the power relay assembly measured through the drive state measurer is abnormal or upon determining based on a vehicle state received from the battery controller that a vehicle is in an emergency state.

11 Claims, 5 Drawing Sheets

(56) References Cited

U.S. PATENT DOCUMENTS

| | | | | |
|---|---|---|---|---|
| 2010/0026429 A1* | 2/2010 | Roessler | ............... | H01H 9/542 335/201 |
| 2010/0296204 A1* | 11/2010 | Ichikawa | ............... | B60K 6/445 361/15 |
| 2014/0125290 A1* | 5/2014 | Kim | ............... | H02J 7/0065 320/135 |
| 2015/0084404 A1* | 3/2015 | Hashim | ............... | B60L 11/18 307/9.1 |
| 2015/0372477 A1* | 12/2015 | Mo | ............... | H02H 7/222 361/91.5 |
| 2016/0093456 A1* | 3/2016 | Dulle | ............... | H01H 47/002 307/130 |
| 2016/0203932 A1* | 7/2016 | Niehoff | ............... | H01H 9/542 361/170 |
| 2016/0264012 A1* | 9/2016 | Im | ............... | B60L 11/1848 |

* cited by examiner

APPARATUS FOR TRANSMITTING POWER AND CONTROL METHOD THEREOF

CROSS REFERENCE TO RELATED APPLICATIONS

This application claims the benefit of Korean Application No. 10-2014-0074417, filed on Jun. 18, 2014. The content of this application is hereby incorporated by reference in its entirety.

BACKGROUND

1. Technical Field

The present invention relates to an apparatus for transmitting power and a control method thereof. More particularly, the present invention relates to an apparatus for transmitting high voltage power to a high voltage load, which prevents an arc strike by driving a high voltage relay after performing pre-charge control through a semiconductor switch and provides a fail-safe function by performing switching operation according to a fault of a vehicle and a state of a power relay assembly, and a control method thereof.

2. Description of the Related Art

Hybrid vehicle, fuel cell vehicles, plug-in hybrid vehicles, electric vehicles or the like employs energy of a high voltage battery to drive a motor. That is, electric energy of the high voltage battery is converted into mechanical energy through the motor to move the vehicle by rotating wheels of the vehicle.

A battery switch is provided between the high voltage battery and a vehicle component for driving the motor, such as an inverter, and performs switching operation such that voltage can be applied from the high voltage battery to the vehicle component such as the inverter via the battery switch.

When a fault occurs in the components or system of the vehicle, such a battery switch must be turned off as quick as possible in order to protect a system of the vehicle and a driver, and disconnect the high voltage battery from other components.

Accordingly, when a fault occurs in the components or system of the vehicle, the battery switch must be turned off, regardless of quantity of electric current flowing through the battery switch.

However, when the battery switch is turned off while high electric current flows, surrounding inductance causes overvoltage to a contact point of the switch. In this case, when the battery switch employs a mechanical contact point, contact fusion can be formed. In addition, when the battery switch is a semiconductor device, the components are damaged by the overvoltage.

If the high voltage battery is not disconnected from the system due to the fusion or damage of the battery switch, secondary accident can occur and a driver can be electrically shocked.

To solve this problem, electric vehicles and hybrid vehicles employ a power relay assembly as a power shut-off device to supply and shut off power from the high voltage battery to the motor via a power control unit (PCU). The power relay assembly serves as a safety device for completely shutting off power in the event of system error, repair, or the like.

The power relay assembly includes a high voltage relay such as a pre-charging relay (450V, 5 A or higher), a main relay (450V, 60~150 A or higher), and the like.

The high voltage relay has a mechanical relay structure in which special gas, for example, $H_2$ gas, is injected and sealed to prevent a spark that is likely to occur at a contact point of the relay when it supplies or shuts off high voltage/high current.

Therefore, the high voltage relay is heavy due to the special gas and increases the gross weight of the power relay assembly, thereby decreasing fuel efficiency.

The background technique of the present invention is disclosed in Korean Patent Publication No. 2010-0062702A (Publication date: Jun. 10, 2010, entitled "Device for protecting battery switch and method thereof").

BRIEF SUMMARY

The present invention has been conceived to solve such problems in the art, and it is an aspect of the present invention to provide an apparatus for transmitting high voltage power to a high voltage load, which prevent an arc strike by driving a high voltage relay after performing pre-charging control through a semiconductor switch, and a control method thereof.

It is another aspect of the present invention to provide an apparatus for transmitting high voltage power to a high voltage load, which provides a fail-safe function by performing switching operation according to fault of a vehicle and a state of a power relay assembly, and a control method thereof.

In accordance with one aspect of the present invention, an apparatus for transmitting power includes: a first main relay electrically controlling connection between a positive (+) terminal of a high voltage power source and a positive (+) terminal of a high voltage load; a second main relay electrically controlling connection between a negative (−) terminal of the high voltage power source and a negative (−) terminal of the high voltage load; a semiconductor switch connected in parallel to the first main relay; a reverse current preventer interposed between the semiconductor switch and the high voltage power source and preventing reverse current to the high voltage power source; a drive state measurer measuring a drive state of a power relay assembly; and a relay controller supplying or shutting off power to the high voltage load by operating the first and second main relays and the semiconductor switch in response to a relay enable signal from a battery controller and shutting off the power to the high voltage load upon determining that the drive state of the power relay assembly measured through the drive state measurer is abnormal or upon determining based on a vehicle state received from the battery controller that a vehicle is in an emergency state.

The relay controller may operate the second main relay, the semiconductor switch and the first main relay in sequence, and then turn off the semiconductor switch, when supplying the power to the high voltage load.

The relay controller may operate the semiconductor switch, and then turn off the first main relay, the semiconductor switch and the second main relay in sequence, when shutting off the power to the high voltage load.

The reverse current preventer may include a high-capacity diode connected in a reverse direction.

The semiconductor switch may include one of an insulated gate bipolar transistor (IGBT), a field effect transistor (FET), and a metal oxide semiconductor field effect transistor (MOSFET).

The drive state measurer may include at least one selected from among a current measurer measuring an electric current flowing from the high voltage power source to the first main relay; a voltage measurer measuring a voltage at the positive (+) terminal of the high voltage load; a relay state measurer measuring a fusion state of the first main relay by measuring voltages at both terminals of the first main relay; a temperature measurer measuring an inner temperature of the power relay assembly; and an insulation measurer measuring insulation resistance between both terminals of the high voltage load.

The relay controller may shut off the power to the high voltage load and transmit information about a shut-off state to the battery controller.

In accordance with another aspect of the present invention, a method of controlling an apparatus for transmitting power includes: by a relay controller, measuring a fusion state of a main relay through a drive state measurer when started up; by the relay controller, receiving a relay enable signal when the measured fusion state of a main relay is normal; by the relay controller, supplying power to a high voltage load when the relay enable signal is on; by the relay controller, receiving a drive state of a power relay assembly from the drive state measurer after supplying power to the high voltage load; by the relay controller, shutting off the power to the high voltage load upon determining that the drive state of the power relay assembly is abnormal; and by the relay controller, shutting off the power to the high voltage load when the received relay enable signal is OFF.

Supplying power to the high voltage load may include, by the relay controller, turning on a second main relay electrically controlling connection between a negative (−) terminal of a high voltage power source and a negative (−) terminal of the high voltage load, when supplying the power to the high voltage load; turning on a semiconductor switch connected between a positive (+) terminal of the high voltage power source and a positive (+) terminal of the high voltage load, when a second preset time elapses after turning on the second main relay; turning on a first main relay connected in parallel to the semiconductor switch and electrically controlling connection between the high voltage power source and the high voltage load, when a first preset time elapses after turning on the semiconductor switch; and turning off the semiconductor switch, when the second preset time elapses after turning on the first main relay.

The first preset time may be in the range of 5 ms to 15 ms and the second preset time may be in the range of 45 ms to 55 ms.

Shutting off the power to the high voltage load may include, by the relay controller, turning on a semiconductor switch connected between a positive (+) terminal of a high voltage power source and a positive (+) terminal of the high voltage load when shutting off the power to the high voltage load; turning off a first main relay connected in parallel to the semiconductor switch and electrically controlling connection between the high voltage power source and the high voltage load, when a first preset time elapses after turning on the semiconductor switch; turning off the semiconductor switch when the first preset time elapses after turning off the first main relay; and turning off a second main relay electrically controlling connection between a negative (−) terminal of the high voltage power source and a negative (−) terminal of the high voltage load, when the first preset time elapses after turning off the semiconductor switch.

The first preset time may be in the range of 5 ms to 15 ms.

Turning on the semiconductor switch may include turning on the semiconductor switch when the first preset time elapses, if the relay enable signal is OFF.

The method may further include, by the relay controller, measuring a fusion state of the first main relay through the drive state measurer after turning off the second main relay.

The method may further include, by the relay controller, shutting off the power to the high voltage load upon determining that a vehicle state received from a battery controller is an emergency state.

The method may further include, by the relay controller, transmitting information about a shut-off state to a battery controller after shutting off the power to the high voltage load.

According to the present invention, the apparatus for transmitting power prevents an arc strike by performing pre-charge control through a semiconductor switch when a high voltage relay is driven, whereby a width of selection for the high voltage relay can be widened, thereby reducing the weight of the power relay assembly with a lighter high-voltage relay while improving vehicle fuel efficiency.

In addition, according to the present invention, the apparatus for transmitting power allows an independent fail-safe function to operate upon vehicle collision and accidents by internally shutting off high voltage power based on determination as to fault occurrence of a vehicle and a state of the power relay assembly, thereby preventing secondary vehicle accidents, such as electric shock, fire, and the like.

Further, according to the present invention, the apparatus for transmitting power allows the semiconductor switch and the high-voltage relay to be driven while securing a stabilizing time for switching operation, thereby improving durability of components by stably supplying and shutting off power.

Furthermore, according to the present invention, the apparatus for transmitting power can control the quantity and flow time of electric current through the semiconductor switch (i.e. IGBT), so that a pre-charging relay applied with different capacities according to the kind of power supply can be applied in common by controlling the quantity of electric current through the semiconductor switch, and a pre-charge resister required for existing mechanical relays can be replaced and eliminated by controlling the flow time of electric current, thereby decreasing costs.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, embodiments of the invention will be described in detail with reference to the accompanying drawings. It should be noted that the drawings are not to precise scale and may be exaggerated in thickness of lines or size of components for descriptive convenience and clarity only. In addition, the terms used herein are defined by taking functions of the present invention into account and can be changed according to user or operator custom or intention. Therefore, definition of the terms should be made according to the overall disclosure set forth herein.

Figure 1:
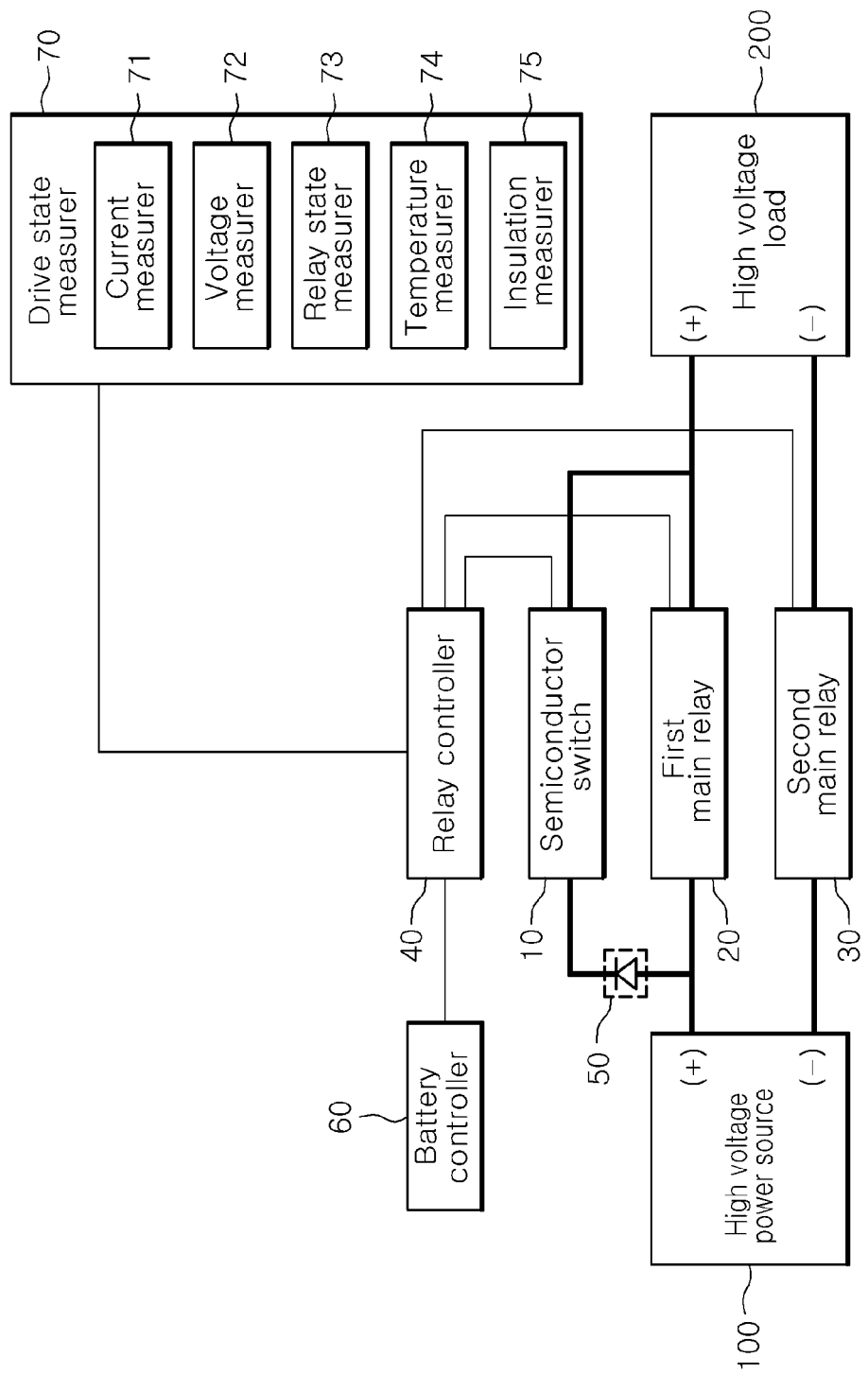
FIG. 1 is a circuit diagram of an apparatus for transmitting power according to one embodiment of the present invention.
Figure 2:
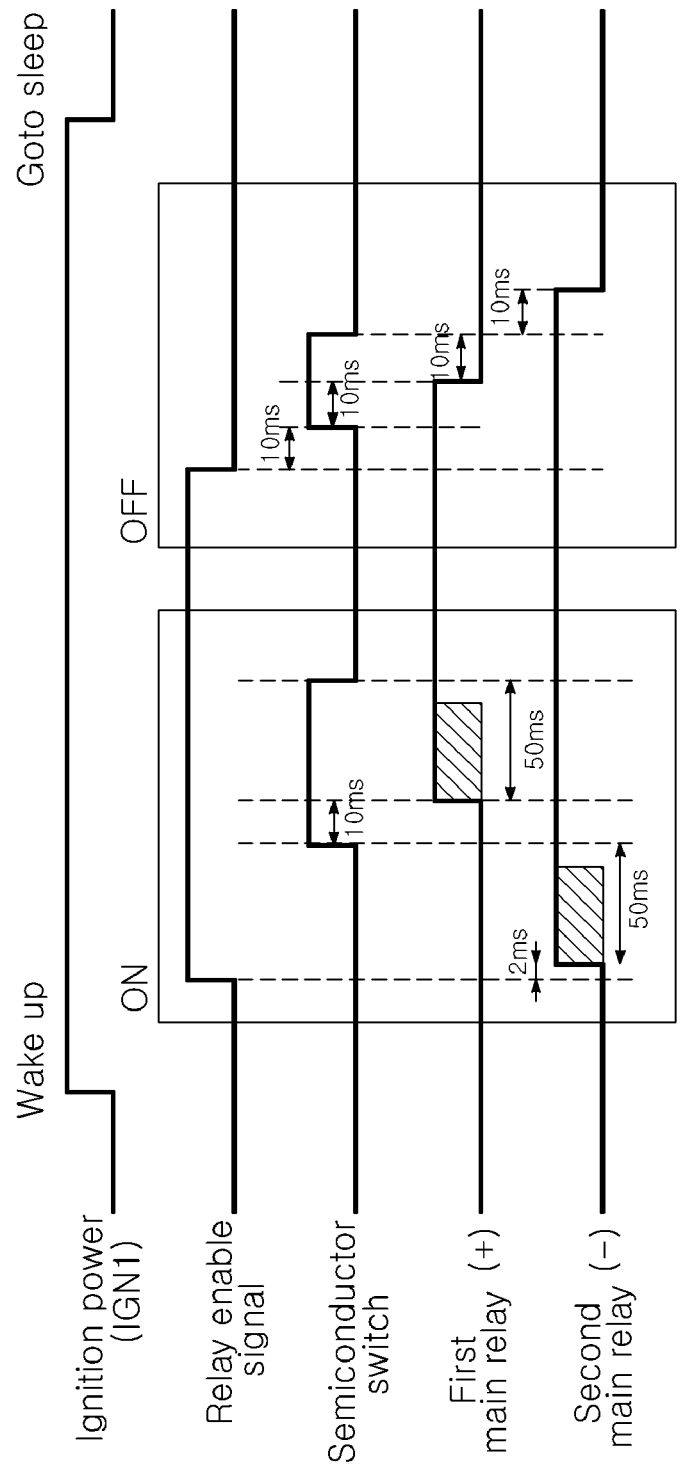
FIG. 2 is a timing diagram showing an operation state of the apparatus for transmitting power according to the embodiment of the present invention.

FIG. 1 is a circuit diagram of an apparatus for transmitting power according to one embodiment of the present invention and FIG. 2 is a timing diagram showing an operation state of the apparatus for transmitting power according to the embodiment of the present invention.

Referring to FIG. 1, an apparatus for transmitting power according to one embodiment of the present invention includes a first main relay 20, a second main relay 30, a semiconductor switch 10, a reverse current preventer 50, a drive state measurer 70, and a relay controller 40.

The first main relay 20 is a high voltage relay that electrically controls connection between positive (+) terminals of a high voltage power source 100 and positive (+) terminals of a high voltage load 200.

The second main relay 30 is a high voltage relay that electrically controls connection between negative (−) terminals of a high voltage power source 100 and negative (−) terminals of a high voltage load 200.

The semiconductor switch 10 is connected in parallel to the first main relay 20 and supplies power for pre-charging a capacitor (not shown) in the high voltage load 200.

The semiconductor switch 10 may include any one of an insulated gate bipolar transistor (IGBT), a field effect transistor (FET), and a metal oxide semiconductor field effect transistor (MOSFET).

The semiconductor switch 10 may control a flow quantity and flow time of electric current, so that a pre-charging relay applied with different capacities according to the kind of power supply can be applied in common by controlling the quantity of electric current, and a pre-charge resister required for existing mechanical relays can be replaced and eliminated by controlling the flow time of electric current.

The reverse current preventer 50 is interposed between the semiconductor switch 10 and the high voltage power source 100 so as to physically disconnect the high voltage power source 100 from the high voltage load 200 when the semiconductor switch 10 is turned off, thereby preventing reverse current to the high voltage power source 100.

In this embodiment, a high-capacity diode is connected in a reverse direction as the reverse current preventer 50.

The drive state measurer 70 measures a drive state when a power relay assembly is driven, thereby providing the measured drive state to the relay controller 40.

The drive state measurer 70 includes at least one of a current measurer 71 measuring an electric current flowing from the high voltage power source 100 to the first main relay 20, a voltage measurer 72 measuring a voltage at the positive (+) terminal of the high voltage load 200, a relay state measurer 73 measuring voltages applied at both terminals of the first main relay 20 and determining a relay fusion state, a temperature measurer 74 measuring an inner temperature of the power relay assembly, and an insulation measurer 75 measuring insulation resistance between both terminals of the high voltage load 200.

Thus, the drive state measurer 70 performs self-diagnosis with regard to the drive state of the power relay assembly, and provides information about a fault to the relay controller 40 when the fault occurs, thereby not only shutting off power to prevent electric shock, but also operating independently of a battery controller 60 to perform a fail-safe function.

The relay controller 40 operates the first main relay 20 and the second main relay 30 after operating the semiconductor switch 10 to pre-charge the capacitor in the high voltage load 200, when supplying or shutting off power to the high voltage load 200.

The relay controller 40 drives the semiconductor switch 10, the first main relay 20 and the second main relay 30 to supply or shut off the power to the high voltage load 200 according to ON/OFF of a relay enable signal sent from the battery controller 60.

The relay controller 40 detects a state of the power relay assembly, that is, receives a current state, voltage state, contact fusion state, temperature state, and insulation resistance state from the drive state measurer 70, and independently shuts off the power upon determining based on the measured state that a fault occurs.

The relay controller 40 may receive a vehicle state from the battery controller 60 and determine an emergency state such as a vehicle accident. Upon determining that the vehicle is in an emergency state, the relay controller 40 shuts off the power to the high voltage load 200 and transmits information about a shutoff state to the battery controller 60.

This operation will be described hereinafter in detail with reference to the timing diagram of FIG. 2 showing the operation state of the apparatus for transmitting the power.

If a starter switch (not shown) is turned on and an ignition power IGN1 is turned on, the relay controller 40 wakes and enters standby.

The relay controller 40 compares voltages applied at both terminals of the first main relay 20 through the relay state measurer 73 of the drive state measurer 70 to measure the fusion state of the main relay, thereby providing information about the fusion state.

If fusion occurs in the main relay, information about the fusion state is transmitted to the battery controller 60 such that the fail-safe function can be performed due to fusion occurrence at a starting time of the vehicle.

When the relay enable signal from the battery controller 60 becomes ON, the relay controller 40 turns on the second main relay 30 and then turns on the semiconductor switch 10 to pre-charge the capacitor in the high voltage load 200 after a second preset time elapses. After a first preset time elapses, the relay controller 40 operates the first main relay 20 and then turns off the semiconductor switch 10 to supply power by connecting the high voltage load 200 and the high voltage power source 100, after the second preset time elapses again.

On the other hand, if the starter switch is turned off and thus the relay enable signal becomes OFF in order to shut off the power from the battery controller 60 to the high voltage load 200, or if the power is shut off based on the fail-safe function, the relay controller 40 turns on the semiconductor switch 10 to form an equipotential state after the first preset time elapses, turns off the first main relay 20 after the first preset time elapses again, turns off the semiconductor switch 10 after the first preset time elapses again, and turns off the second main relay 30 after the first preset time elapses again, thereby disconnecting the high voltage load 200 from the high voltage power source 100 to shut off power supply. Then, the relay controller 40 enters a sleep mode as the ignition power IGN1 is turned off.

Thus, according to the embodiment, the semiconductor switch 10 is turned on to pre-charge the capacitor in the high voltage load 200, or the first main relay 20 is turned on/off in an equipotential state, thereby preventing an arc strike.

In this embodiment, the first preset time is in the range of 5 ms to 15 ms and the second preset time is in the range of 45 ms to 55 ms, but not limited thereto. Alternatively, the first preset time and the second preset time may be set to optimally stable times in consideration of the voltage state, load state and components of the power relay assembly.

Thus, according to the embodiment, the switching operation is performed under conditions that the semiconductor switch 10 and the first and second main relays 20, 30 are stabilized through the first preset time and the second preset time, thereby stably supplying and shutting off power.

As described above, the apparatus for transmitting power according to the embodiment of the present invention prevents an arc strike by performing pre-charge control through the semiconductor switch when the high voltage relay is driven, whereby a width of selection for the high voltage relay can be widened, thereby reducing the weight of the power relay assembly with a lighter high-voltage relay.

In addition, the apparatus for transmitting power can improve vehicle fuel efficiency, and allows the semiconductor switch and the high-voltage relay to be driven while securing a stabilizing time for switching operation, thereby improving durability of components by stably supplying and shutting off power. Further, the apparatus for transmitting power allows an independent fail-safe function to operate upon vehicle collision and accidents by internally shutting off high voltage power based on determination as to fault occurrence of a vehicle and a state of the power relay assembly, thereby preventing secondary vehicle accidents, such as electric shock, fire, and the like.

Figure 3:
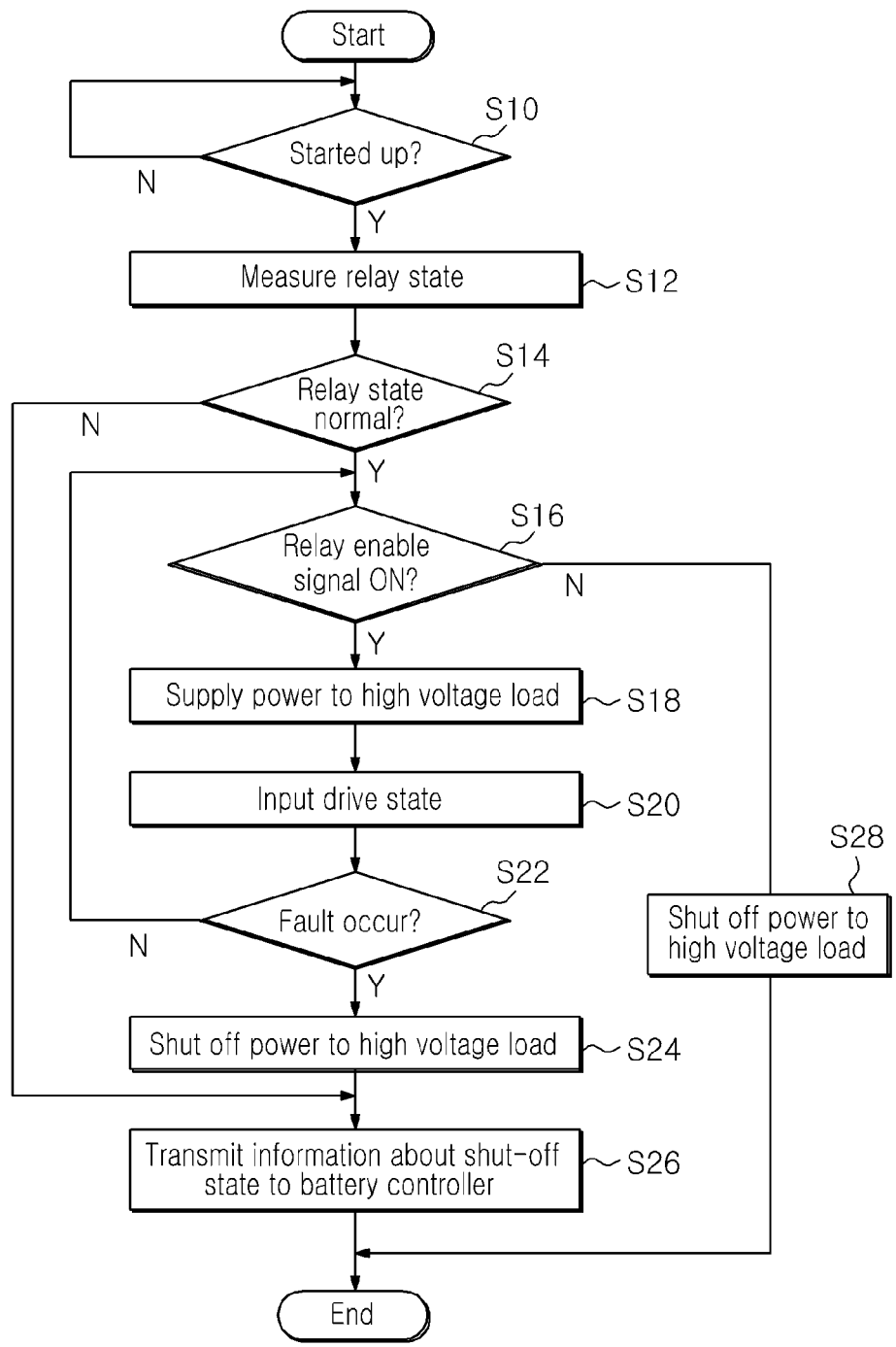
FIG. 3 is a flowchart of a control method of the apparatus for transmitting power according to the embodiment of the present invention.
Figure 4:
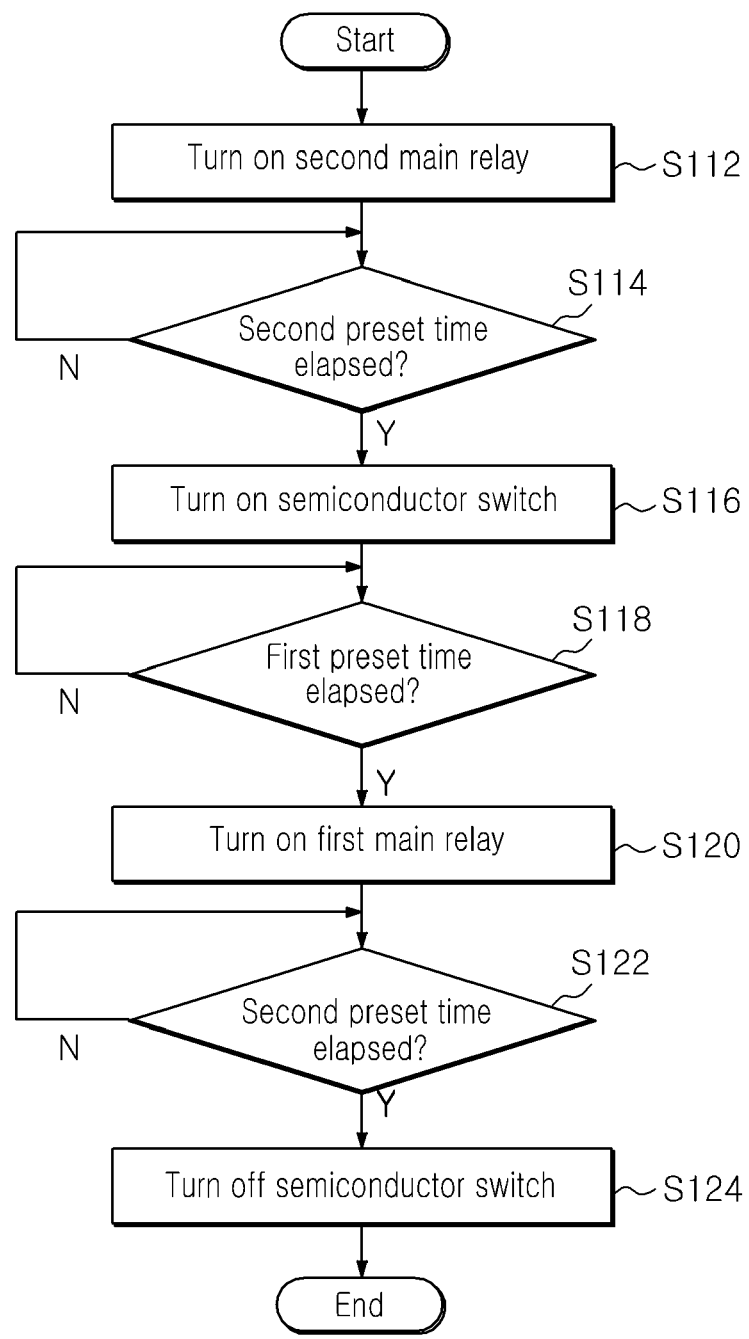
FIG. 4 is a flowchart of a process of supplying power in the control method of the apparatus for transmitting power according to the embodiment of the present invention.
Figure 5:
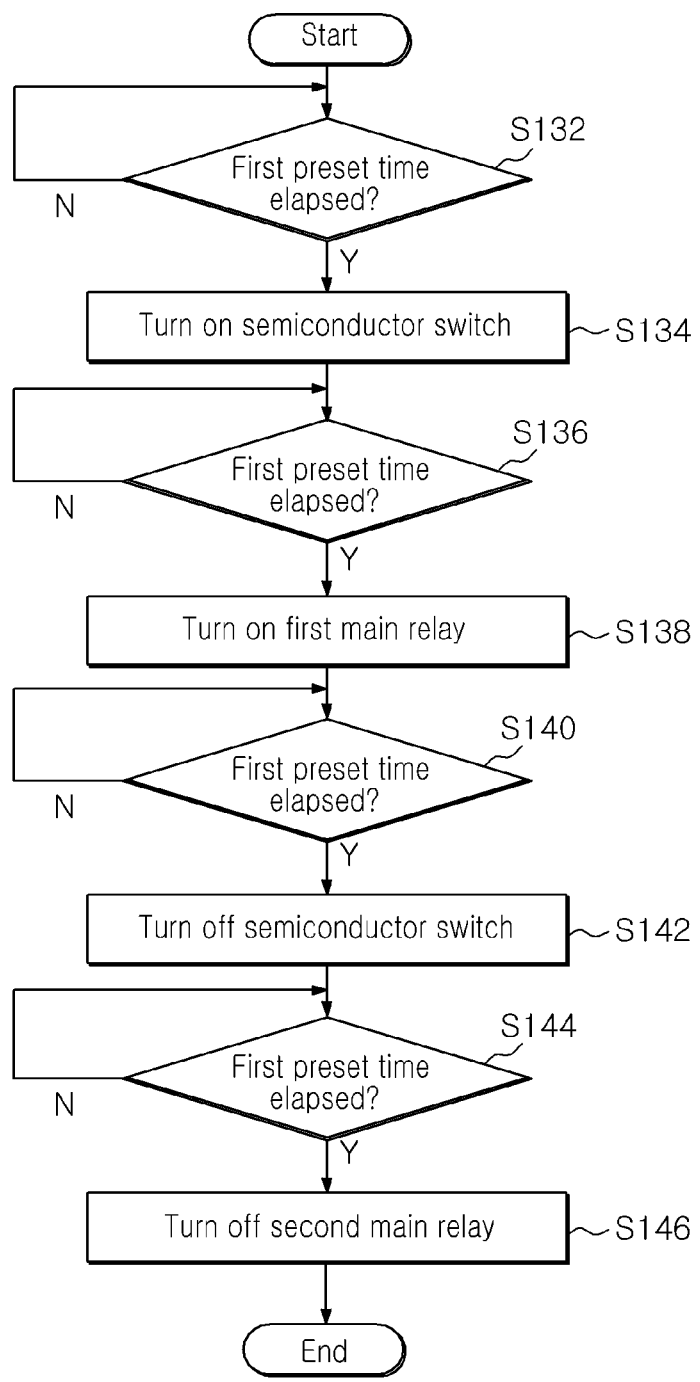
FIG. 5 is a flowchart of a process of shutting off power in the control method of the apparatus for transmitting power according to the embodiment of the present invention.

FIG. 3 is a flowchart of a control method of the apparatus for transmitting power according to the embodiment of the present invention, FIG. 4 is a flowchart of a process of supplying power in the control method of the apparatus for transmitting power according to the embodiment of the present invention, and FIG. 5 is a flowchart of a process of shutting off power in the control method of the apparatus for transmitting power according to the embodiment of the present invention.

Referring to FIG. 3, in the method of controlling the apparatus for transmitting power according to the embodiment of the present invention, when the starter switch (not shown) is first turned on and the ignition power IGN1 is then turned on (S10), the relay controller 40 measures a fusion state of the first main relay 20 through the drive state measurer 70 (S12).

The fusion state of the first main relay 20 may be determined by measuring voltages at both terminals of the first main relay 20 and then compares the voltages corresponding to on/off of the first main relay 20.

Then, the relay controller 40 determines whether a relay state is normal based on the measurement results of the fusion state of the first main relay 20 (S14). Upon determining that the relay state is normal, the relay controller 40 receives a relay enable signal and determines whether the relay enable signal is ON (S16).

On the other hand, if it is determined in S14 that the relay state is abnormal, the relay controller 40 transmits information about a shut-off state to the battery controller 60 (S26).

If it is determined in S16 that the relay enable signal is on, the relay controller 40 supplies power to the high voltage load 200 (S18).

The process of supplying power to the high voltage load 200 will be described in more detail hereinafter. As shown in FIG. 4, if the relay enable signal received from the battery controller 60 is ON, the relay controller 40 turns on the second main relay 20 that electrically controls connection between the negative (−) terminals of the high voltage power source 100 and the high voltage load 200 (S112).

Then, the relay controller 40 determines whether a second preset time has elapsed after turning on the second main relay 20 (S114). For example, the second preset time may be set in the range of 45 ms to 55 ms to allow stable operation of the second main relay 20.

If it is determined in S114 that the second preset time has elapsed, the relay controller 40 turns on the semiconductor switch 10 interposed between the positive (+) terminal of the high voltage power source 100 and the positive (+) terminal of the high voltage load 200 and pre-charges the capacitor (not shown) in the high voltage load 200 (S116).

After turning on the semiconductor switch 10, the relay controller 40 determines whether the first preset time has elapsed (S118). At this time, the first preset time is set in the range of 5 ms to 15 ms so as to pre-charge the capacitor.

If it is determined in S118 that the first preset time has elapsed, the relay controller 40 turns on the first main relay 20 (S120).

Then, the relay controller 40 determines whether the second preset time has elapsed (S122).

If it is determined in S122 that the second preset time has elapsed, the relay controller 40 turns off the semiconductor switch 10 such that the high voltage load 200 and the high voltage power source 100 can be stably connected, thereby supplying power while preventing an arc strike (S124).

Through the foregoing operations S112 to S124, the relay controller 40 supplies power to the high voltage load 200 and then receives a drive state of the power relay assembly from the drive state measurer 70 (S20).

Further, the relay controller 40 compares a current state, voltage state, contact fusion state, temperature state, and insulation resistance state from the drive state measurer 70 with the respective settings, and determines whether a fault occurs (S22).

As a result of determining whether a fault occurs, if no fault occurs, the relay controller 40 returns to operation S16 and determines the state of the relay enable signal. If the relay enable signal is ON, the relay controller 40 continues to supply power to the high voltage load 200.

However, if it is determined in S22 that the state of the power relay assembly is abnormal, the relay controller 40 shuts off power supplied to the high voltage load 200 (S24), and transmits information about the shut-off state to the battery controller 60 (S26).

The relay controller 40 receives a vehicle state from the battery controller 60 and determines an emergency state such as vehicle accidents. Upon determining that the vehicle state is the emergency state, the relay controller 40 may shut off the power to the high voltage load 200.

In this way, the relay controller 40 first shuts off power supply if it is determined through self-diagnosis that the drive state of the power relay assembly is abnormal, and then transmits information about the shut-off state to the battery controller 60, thereby preventing electric shock.

On the other hand, if it is determined in S16 that the relay enable signal is OFF, the relay controller 40 shuts off the power to the high voltage load 200 (S28).

The process of shutting off the power to the high voltage load 200 will be described in more detail hereinafter. As shown in FIG. 5, if the relay enable signal received from the battery controller 60 is OFF, or if the drive state of the power relay assembly received from the drive state measurer is abnormal, the relay controller 40 determines whether the first preset time has elapsed (S132).

The first preset time may be set in the range of 5 ms to 15 ms to allow stable switching operation.

If it is determined in S132 that the first preset time has elapsed, the relay controller 40 turns on the semiconductor switch 10 interposed between the positive (+) terminal of the high voltage power source 100 and the positive (+) terminal of the high voltage load 200 to form an equipotent state (S134).

In this embodiment, it is determined whether the relay enable signal received from the battery controller 60 is OFF. In other embodiments, the relay controller 40 may detect the state of the power relay assembly, that is, a current state, voltage state, insulation resistance state, temperature state and contact fusion state, and may independently shut off power when a fault occurs. Here, when the relay controller shuts off power supply by receiving an abnormal state of the vehicle sent from the battery controller 60, the relay controller may turn on the semiconductor switch 10 to form an equipotent state, regardless of the state of the relay enable signal.

Then, the relay controller 40 turns on the semiconductor switch 10 and determines whether the first preset time has elapsed (S136).

If it is determined in S136 that the first preset time has elapsed, the relay controller 40 turns off the first main relay 20 (S138). As such, the first main relay 20 is turned off in an equipotential state, thereby preventing an arc strike.

After turning off the first main relay 20, the relay controller 40 determines whether the first preset time has elapsed (S140).

If it is determined in S140 that the first preset time has elapsed, the relay controller 40 turns off the semiconductor switch 10 (S142).

Next, the relay controller 40 turns off the semiconductor switch 10 and determines whether the first preset time has elapsed (S144).

If it is determined in S144 that the first preset time has elapsed, the relay controller 40 turns off the second main relay 30 to disconnect the high voltage load 200 from the high voltage power source 100, thereby shutting off the power (S146).

Then, the relay controller 40 enters a sleep mode as the ignition power IGN1 becomes turned off.

The relay controller 40 turns off the second main relay 30 and measures a fusion state of the first main relay 20 through the drive state measurer 70.

As described above, in the method of controlling the apparatus for transmitting power according to the embodiment of the present invention, an arc strike is prevented by performing pre-charge control through the semiconductor switch when the high voltage relay is driven, whereby a width of selection for the high voltage relay can be widened, thereby reducing the weight of the power relay assembly with a lighter high-voltage relay.

In addition, it is possible to improve vehicle fuel efficiency. Further, the semiconductor switch and the high-voltage relay can be driven while securing a stabilizing time for switching operation, thereby improving durability of components by stably supplying and shutting off power. Furthermore, an independent fail-safe function can be operated upon vehicle collision and accidents by internally shutting off high voltage power based on determination as to fault occurrence of a vehicle and a state of the power relay assembly, thereby preventing secondary vehicle accidents, such as electric shock, fire, and the like.

Although some embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

LIST OF REFERENCE NUMERALS

10: semiconductor switch
20: first main relay
30: second main relay
40: relay controller
50: reverse current preventer
60: battery controller
70: drive state measurer
71: current measurer
72: voltage measurer
73: relay state measurer
74: temperature measurer
75: insulation measurer
100: high voltage power source
200: high voltage load

What is claimed is:

1. An apparatus for transmitting power, the apparatus comprising:
a first main relay electrically controlling connection between a positive (+) terminal of a high voltage power source and a positive (+) terminal of a high voltage load;
a second main relay electrically controlling connection between a negative (−) terminal of the high voltage power source and a negative (−) terminal of the high voltage load;
a semiconductor switch connected in parallel to the first main relay;
a reverse current preventer interposed between the semiconductor switch and the high voltage power source and preventing reverse current to the high voltage power source;
a drive state measurer measuring a drive state of a power relay assembly; and
a relay controller supplying or shutting off power to the high voltage load by operating the first and second main relays and the semiconductor switch in response to a relay enable signal from a battery controller, and shutting off the power to the high voltage load upon determining that the drive state of the power relay assembly measured through the drive state measurer is abnormal or upon determining based on a vehicle state received from the battery controller that a vehicle is in an emergency state, wherein
the relay controller, to supply the power to the high voltage load, turns on the second main relay, turns on the semiconductor switch when a second preset time elapses after turning on the second main relay, turns on the first main relay when a first preset time elapses after turning on the semiconductor switch, and turns off the semiconductor switch when the second preset time elapses after turning on the first main relay;
the relay controller, to shut off the power to the high voltage load, turns on the semiconductor switch, turns off the first main relay when the first preset time elapses after turning on the semiconductor switch, turns off the semiconductor switch when the first preset time elapses after turning off the first main relay, and turns off the second main relay when the first preset time elapses after turning off the semiconductor switch; and the relay controller controls flow time of electric current flowing from the high voltage power source to the high voltage load through the semiconductor switch by controlling operation of the semiconductor switch.

2. The apparatus according to claim 1, wherein the reverse current preventer comprises a high-capacity diode connected in a reverse direction.

3. The apparatus according to claim 1, wherein the semiconductor switch comprises one of an insulated gate bipolar transistor (IGBT), a field effect transistor (FET), and a metal oxide semiconductor field effect transistor (MOSFET).

4. The apparatus according to claim 1, wherein the drive state measurer comprises at least one selected from among:
- a current measurer measuring an electric current flowing from the high voltage power source to the first main relay;
- a voltage measurer measuring a voltage at the positive (+) terminal of the high voltage load;
- a relay state measurer measuring a fusion state of the first main relay by measuring voltages at both terminals of the first main relay;
- a temperature measurer measuring an inner temperature of the power relay assembly; and
- an insulation measurer measuring insulation resistance between both terminals of the high voltage load.

5. The apparatus according to claim 1, wherein the relay controller shuts off the power to the high voltage load and transmits information about a shut-off state to the battery controller.

6. A method of controlling an apparatus for transmitting power, comprising:
- by a relay controller, detecting a fusion state of a main relay through a drive state measurer when an ignition power is turned on;
- by the relay controller, receiving a relay enable signal when the detected fusion state of the main relay is normal;
- by the relay controller, supplying power to a high voltage load when the relay enable signal is on;
- by the relay controller, receiving a drive state of a power relay assembly from the drive state measurer after supplying power to the high voltage load;
- by the relay controller, shutting off the power to the high voltage load upon determining that the drive state of the power relay assembly is abnormal; and
- by the relay controller, shutting off the power to the high voltage load when the received relay enable signal is OFF, wherein supplying power to the high voltage load comprises, by the relay controller, turning on a second main relay electrically controlling connection between a negative (−) terminal of a high voltage power source and a negative (−) terminal of the high voltage load;

turning on a semiconductor switch connected between a positive (+) terminal of the high voltage power source and a positive (+) terminal of the high voltage load, when a second preset time elapses after turning on the second main relay;

turning on a first main relay connected in parallel to the semiconductor switch and electrically controlling connection between the high voltage power source and the high voltage load, when a first preset time elapses after turning on the semiconductor switch; and turning off the semiconductor switch, when the second preset time elapses after turning on the first main relay, shutting off the power to the high voltage load comprises, by the relay controller, turning on the semiconductor switch;

turning off the first main relay when the first preset time elapses after turning on the semiconductor switch;

turning off the semiconductor switch when the first preset time elapses after turning off the first main relay; and turning off the second main relay when the first preset time elapses after turning off the semiconductor switch, and the relay controller controls flow time of electric current flowing from the high voltage power source to the high voltage load through the semiconductor switch by controlling operation of the semiconductor switch.

7. The method according to claim 6, wherein the first preset time is in the range of 5 ms to 15 ms, and the second preset time is in the range of 45 ms to 55 ms.

8. The method according to claim 6, wherein turning on the semiconductor switch when shutting off the power to the high voltage load comprises turning on the semiconductor switch when the first preset time elapses, if the relay enable signal is OFF.

9. The method according to claim 6, further comprising: by the relay controller, detecting a fusion state of the first main relay through the drive state measurer after turning off the second main relay.

10. The method according to claim 6, further comprising: by the relay controller, shutting off the power to the high voltage load upon determining that a vehicle state received from a battery controller is an emergency state.

11. The method according to claim 6, further comprising: by the relay controller, transmitting information about a shut-off state to a battery controller after shutting off the power to the high voltage load.

* * * * *